Feb. 21, 1956
S. C. STUBBS
2,735,400
AUTOMATIC FEED POULTRY BATTERY
Filed Feb. 3, 1954
5 Sheets-Sheet 1
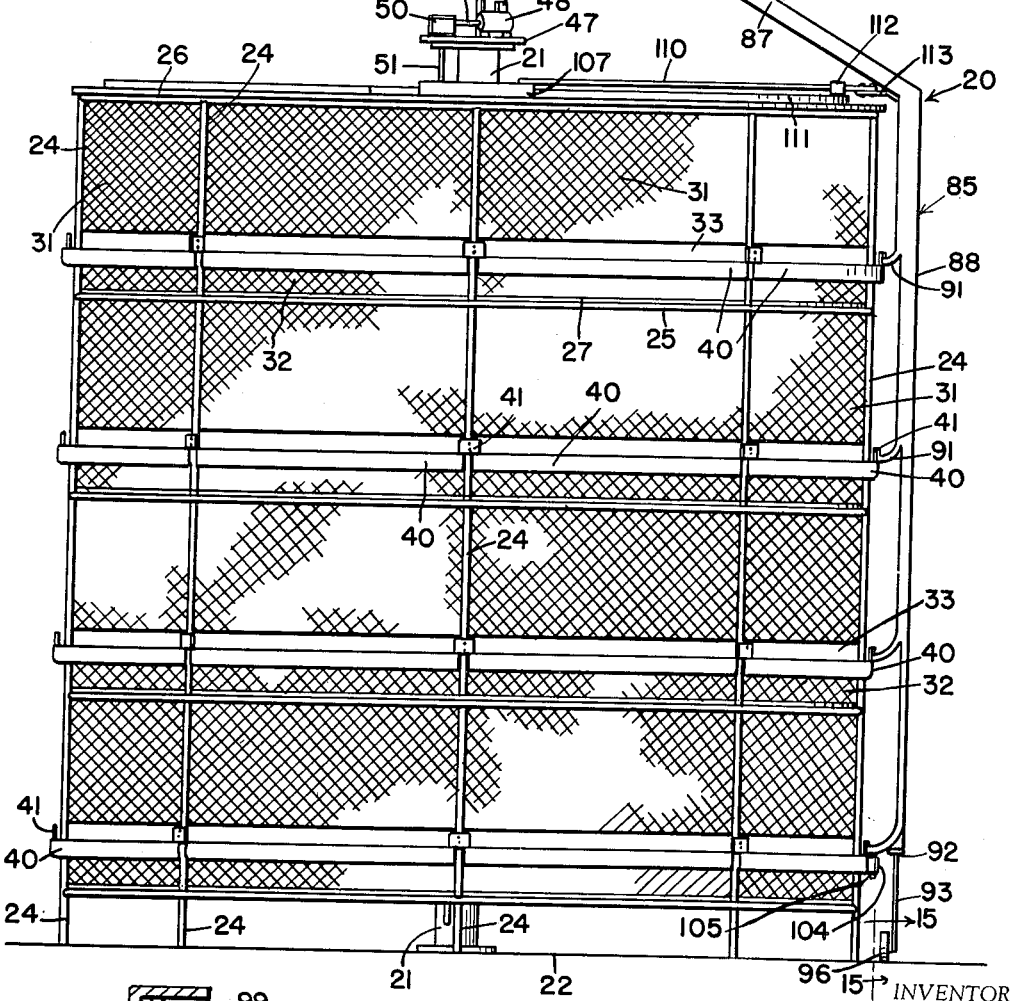
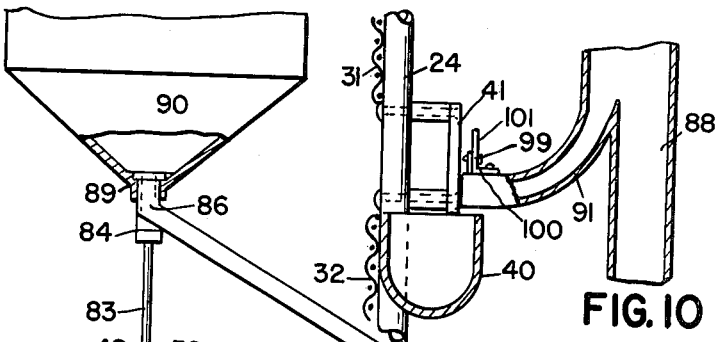
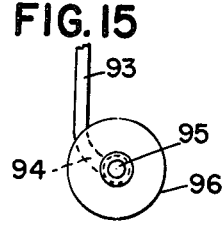
INVENTOR
S. C. Stubbs
BY John N. Randolph
ATTORNEY Feb. 21, 1956
S. C. STUBBS
2,735,400
AUTOMATIC FEED POULTRY BATTERY
Filed Feb. 3, 1954
5 Sheets-Sheet 2
FIG. 2
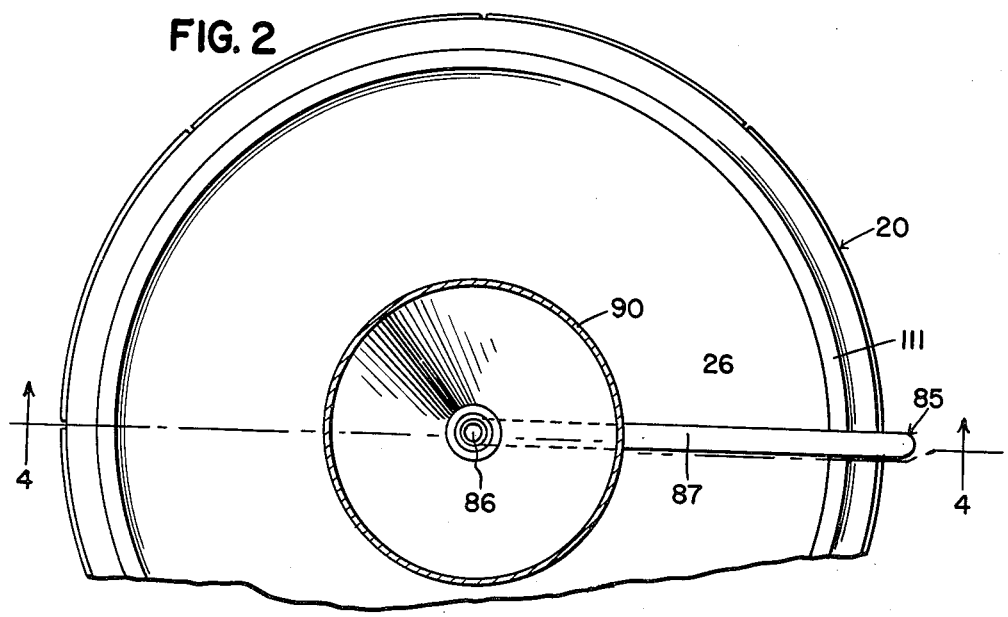
FIG. 6
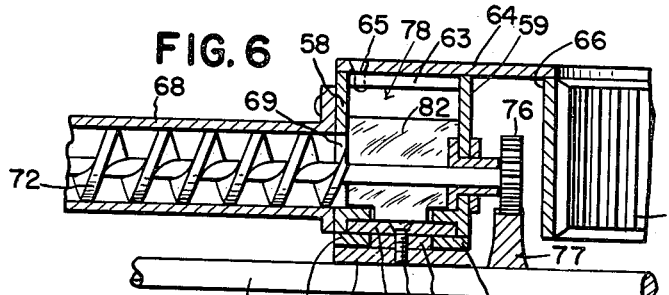
FIG. 13
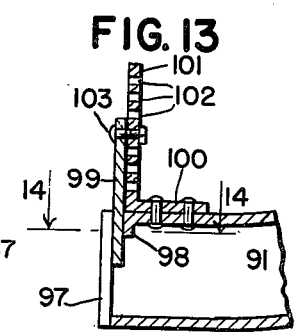
FIG. 7
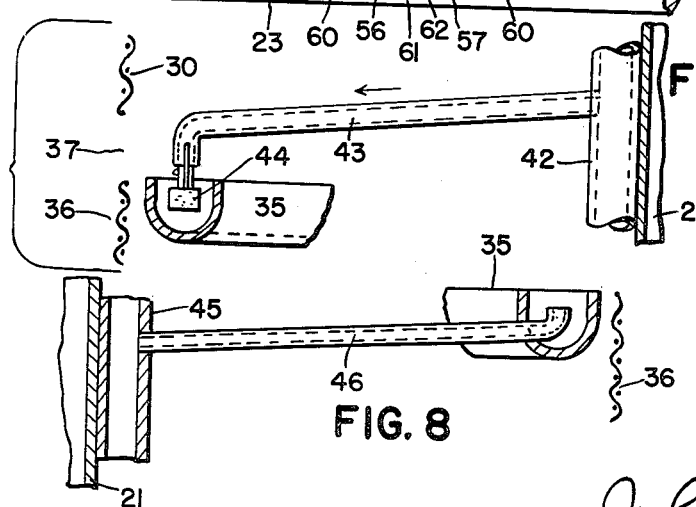
FIG. 8
FIG. 12
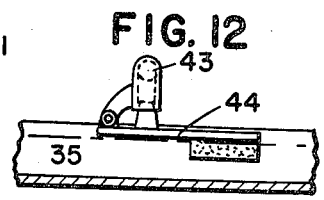
INVENTOR
S.C. Stubbs
BY John N. Randolph
ATTORNEY

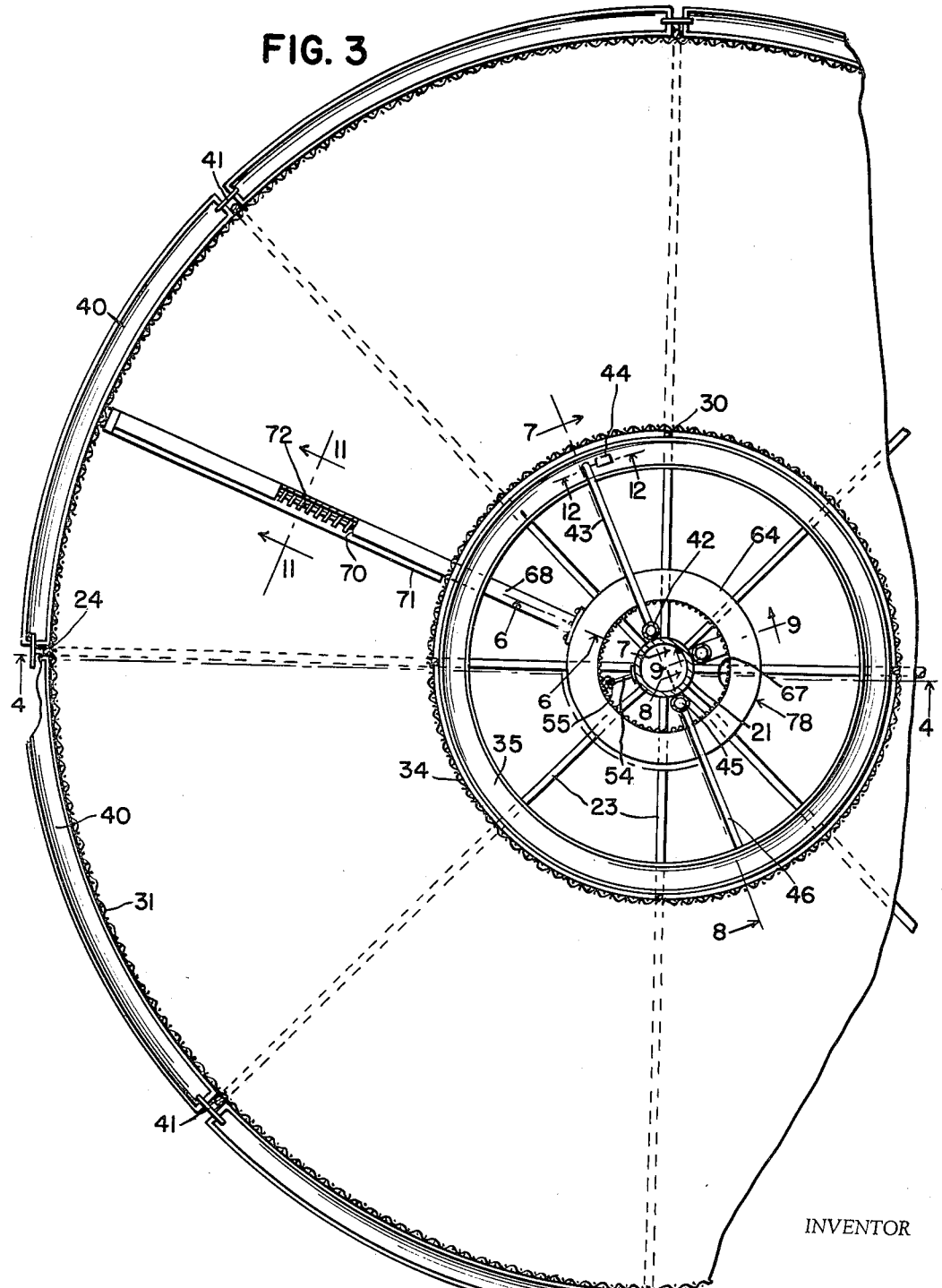

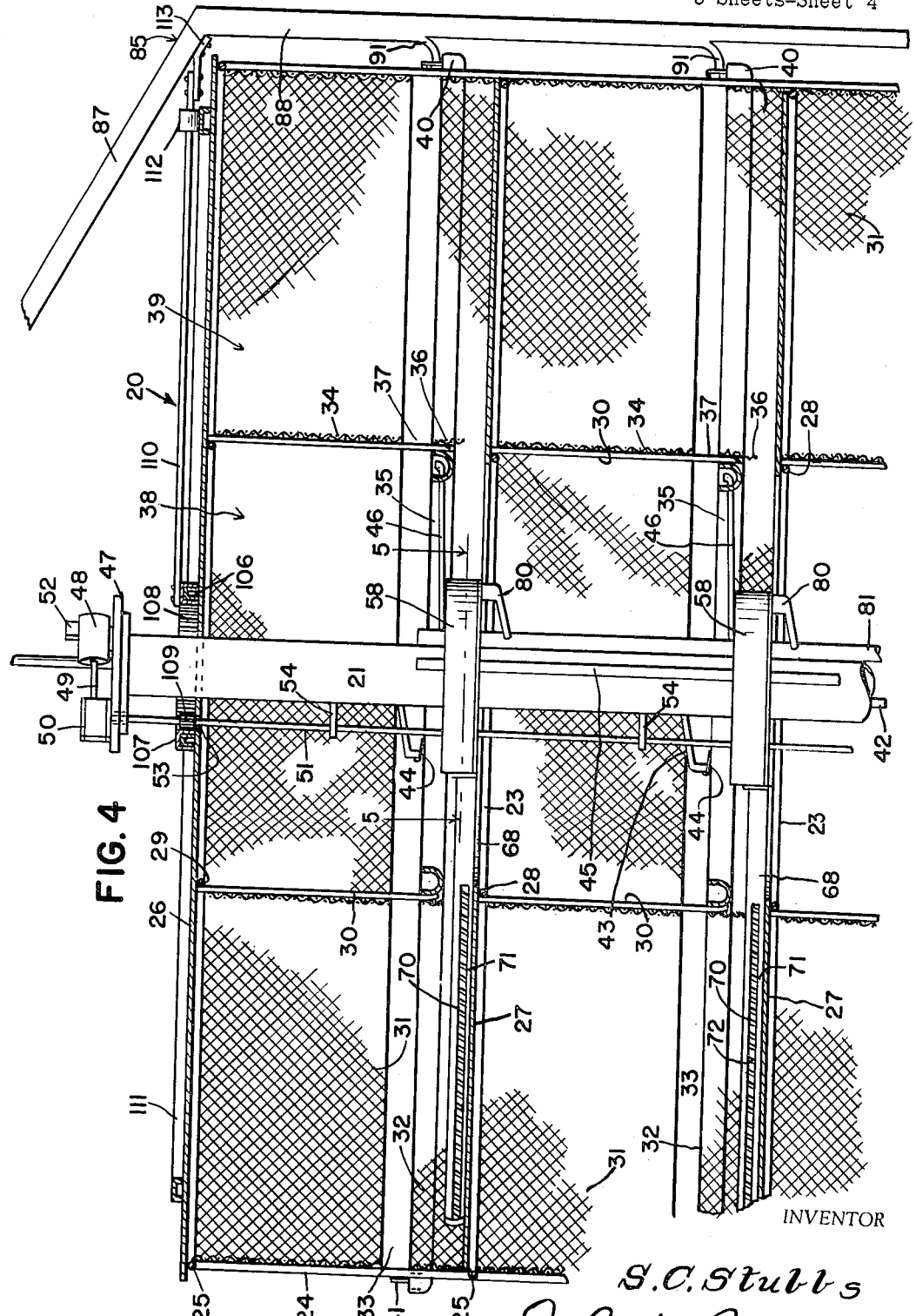

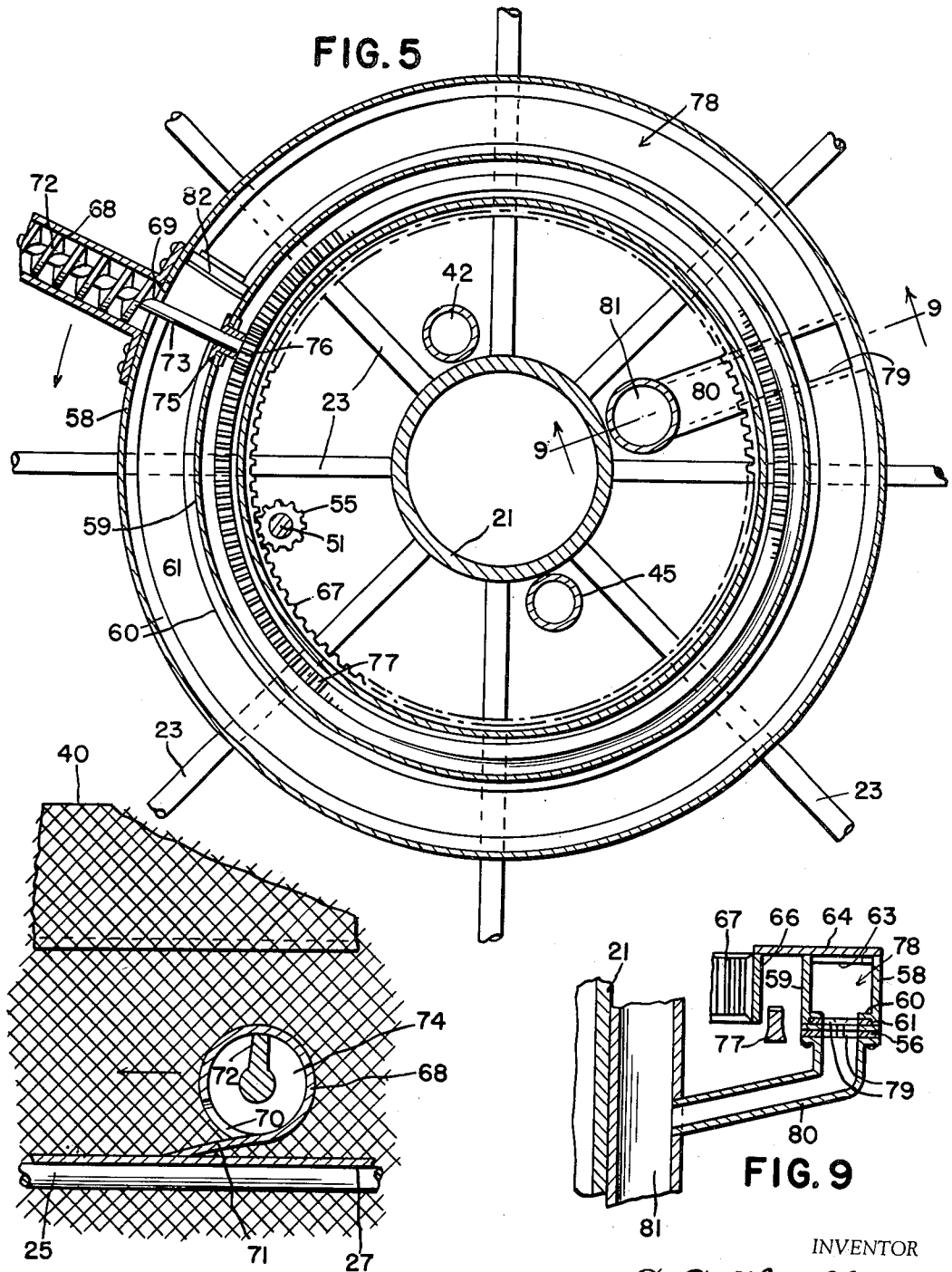

United States Patent Office 2,735,400
Patented Feb. 21, 1956

2,735,400

AUTOMATIC FEED POULTRY BATTERY

Sherman C. Stubbs, Danville, Ill.

Application February 3, 1954, Serial No. 407,869

12 Claims. (Cl. 119—18)

This invention relates to a novel battery for use in raising poultry and which will effect a substantial saving in the amount of space required in the raising of any given number of poultry while affording adequate growing space for the poultry and while providing for adequate ventilation.

More particularly, it is an aim of the present invention to provide a poultry battery composed of a number of corresponding tiers or floors each of which is adapted to contain a number of fowls.

A further object of the invention is to provide a poultry battery which will require substantially no attention due to the fact that automatically operated means is provided for accomplishing the feeding and watering of the poultry and the cleaning of the battery.

Various other objects and advantages of the invention will hereinafter become more fully apparent from the following description of the drawings, illustrating a presently preferred embodiment thereof, and wherein:

Figure 1 is a side elevational view of a poultry battery constructed in accordance with the invention;

Figure 2 is a fragmentary top plan view thereof, partly in horizontal section;

Figure 3 is an enlarged fragmentary horizontal sectional view, partly broken away, through a portion of the battery, taken along a plane substantially midway between and parallel to the two floor members, as seen in Figure 4;

Figure 4 is a fragmentary vertical sectional view of a portion of the battery, taken substantially along a plane as indicated by the lines 4—4 of Figures 2 and 3;

Figure 5 is an enlarged horizontal sectional view taken substantially along a plane as indicated by the line 5—5 of Figure 4;

Figure 6 is an enlarged vertical sectional view taken substantially along a plane as indicated by the line 6—6 of Figure 3;

Figure 7 is an enlarged fragmentary vertical sectional view taken substantially along a plane as indicated by the line 7—7 of Figure 3;

Figure 8 is an enlarged fragmentary vertical sectional view taken substantially along a plane as indicated by the line 8—8 of Figure 3;

Figure 9 is an enlarged vertical sectional view taken substantially along a plane as indicated by the line 9—9 of Figures 3 and 5;

Figure 10 is an enlarged fragmentary vertical sectional view taken radially through a portion of the battery along planes nearly coinciding with the plane of a portion of the right hand part of Figure 4 but showing one of the feed troughs in cross section and portions of the feed supply conduit in vertical section;

Figure 11 is an enlarged fragmentary vertical sectional view taken substantially along a plane as indicated by the line 11—11 of Figure 3;

Figure 12 is an enlarged fragmentary vertical sectional view taken substantially along a plane as indicated by the line 12—12 of Figure 3;

Figure 13 is an enlarged fragmentary longitudinal vertical sectional view taken substantially centrally through one of the discharge spouts of the feed conduit;

Figure 14 is a horizontal sectional view thereof taken substantially along a plane as indicated by the line 14—14 of Figure 13, and Figure 15 is an enlarged fragmentary side elevational view looking in the direction as indicated by the line 15—15 of Figure 1.

Referring more specifically to the drawings, the poultry battery in its entirety is designated generally 20 and includes a center supporting post or column 21, the lower end of which may rest on any suitable supporting surface such as a floor 22. A plurality of supporting rods 23 are suitably secured to and extend radially from the post 21 at vertically spaced points. The outer ends of the horizontal rods 23 are connected to vertically disposed supporting rods 24 in any suitable manner, which rods 24 have lower ends resting on and supported by the surface 22. The joints of the rods 23 and 24 and the upper ends of the rods 24 are connected by arcuately extending rods 25 which extend between said vertical supporting rods 24 and are suitably secured thereto. A top wall 26 of the battery 20 is disposed around and secured to the center post 21 near its upper end and extends outwardly therefrom and is secured adjacent its periphery to the upper arcuate rods 25 and the upper ends of the vertical supporting rods 24. An annular supporting member or floor 27 is disposed on and supported by each set of horizontal rods 23 which are disposed in the same plane and has an inner edge defining a relatively large opening disposed around and spaced outwardly from the post 21 and which is supported on an inner set of arcuate rods 28 which extend between and are secured to corresponding portions of the radial rods 23, at points equally spaced radially from the center post 21. The outer edges of the floor members 23 are secured to and supported by the vertical supporting rods 24 and the arcuate outer rods 25, located adjacent each floor 27. A ring member 29 is secured to the underside of the top wall 26 directly above the inner rods 28 and has a plurality of hanger rods 30 fixed thereto and depending therefrom. Similar hanger rods 30 are secured to and depend from the inner arcuate rods 28 beneath each floor 27, except the bottommost floor.

Sections of mesh wire screening 31 extend between and are secured at their ends to the vertical rods 24 between the floors 27 and the upper floor 27 and the top wall 26, said screen sections 31 combining to form an annular open mesh outer wall in combination with smaller screen sections 32. The screen sections 31 have bottom edges terminating substantially above the floors 27 and the screen sections 32, which are similarly secured at their ends to the vertical supporting rods 24, extend upwardly from each of the floors 27 and terminate at their upper edges substantially below the bottom edges of the screen sections 31 to provide openings 33 therebetween. At least one of the screen sections 31, located above each floor 27 may be detachably connected at at least one end thereof to one of the vertical supports 24 to permit opening of the battery 20 above each floor 27 for applying fowls thereto or for removing fowls therefrom. Inner screen sections 34 which are likewise of arcuate shape are secured at their ends to the hanger rods 30 above each floor 27 and have bottom edges terminating at substantially the level of the bottom edges of the screen sections 31.

An annular watering trough 35 is supported by the lower ends of each set of hanger rods 30 about and spaced from the adjacent floor 27 and substantially below the adjacent screen sections 34. Short screen sections 36 are secured to the lower portions of hanger rods 30 and have upper edges disposed at the levels of the tops of the troughs 35 and bottom edges disposed substantially above the levels of the floors 27 disposed adjacent thereto. The adjacent edges of the screens 34 and 36 form openings 37 affording access to the watering troughs 35. The annular area of the battery 20 between the center post 21 and the screens 34 and 36 constitutes a center service well 38. The annular space between the inner screens 34 and 36 and the outer screens 31 and 32 forms an annular poultry occupying or growing area 39 above each floor 27. It will be readily apparent that the inner and outer screens will afford adequate ventilation for each of the poultry occupying or growing areas of the battery 20 and it will be obvious that perforated sheet metal or similar material could be substituted for the mesh wire fabric screens 31, 32, 34 and 36.

Feed troughs 40 are disposed around each growing area 39, said troughs having closed ends secured to the vertical supports 24 and being disposed around the upper portions of the screen sections 32 and directly beneath the openings 33 through which openings the heads of the fowls are accommodated for reaching the troughs 40. A plate 41 is supported on the outer side of each vertical support 24 above the adjacent ends of the troughs 40, each support 24 supporting a plurality of plates 41, for a purpose that will hereinafter be described.

A water supply pipe 42, leading from any suitable source of water supply under pressure, extends upwardly through the service well 38 adjacent the post 21 and has outlet spouts 43 extending laterally therefrom above and adjacent the level of each trough 35. The depending outlet ends or bibs of the spouts 43 open downwardly into the troughs 35. A float valve 44 is pivotally mounted on each spout 43 with the float thereof disposed in the adjacent water trough 35 for closing the spout when the trough 35 contains water to a desired level. Said float valves 44 are best illustrated in Figures 7 and 12. An outlet pipe 45 extends downwardly through the service well 38 along the post 21 and has branch pipes 46 extending therefrom radially outward and upward. The opposite ends of the branch pipes 46 extend upwardly into the troughs 35 and open within said troughs at a desired level between the trough bottom and the open top of the trough, to prevent water accumulating in the troughs above the level of said inlet ends of the pipes 46, since water above this level will be carried off by gravity through the pipes 46 and the pipe 45.

A platform 47 is supported in substantially a horizontal position on the upper end of the post 21 and provides a support for a motor 48, such as an electric motor, having a drive shaft 49 extending into a gear box 50 which is mounted on the platform 47. The shaft 49 is connected by a reduction gearing, not shown, contained within the gear box 50 to the upper end of a vertical shaft 51 which extends downwardly therefrom through the service well 38. An automatic timer 52 of any suitable construction is provided on the motor 48 causing said motor to be intermittently driven for driving the shaft 51. The shaft 51 extends loosely through an opening 53 of the top wall 26 and is journalled at a plurality of points in bearings 54 which are fixed to and extend outwardly from the center post 21. A gear 55 is fixed to the shaft 51 adjacent each floor level. As best seen in Figure 6, an annular plate 56 is supported on each set of coplanar rods 23 at a point radially spaced outwardly from the post 21 and in turn supports a narrower strip 57 on the upper surface thereof. A pair of radially spaced annular walls 58 and 59 are disposed above each annular plate 56 and said walls are provided at their lower ends with inwardly opening channels 60 which slidably engage an annular plate 61. The channels 60 engage the side edges of the plate 61, the intermediate portion of which rests on the plate 61 is secured immovably by spacing strip 57. Said plate 61 is secured immovably by fastenings 62 to the plate 56 and strip 57. The upper portions of the walls 58 and 59 are connected at spaced points by bars 63 for maintaining a proper spacing between said walls 58 and 59. A top plate 64 closes the open top of the space between the walls 58 and 59 and is secured on the upper edges of said walls by fastenings 65 which engage the bars 63. The top plate 64 extends inwardly from the inner wall 59 and terminates at its inner edge in a depending annular flange 66 the inner side of which is toothed to form internal ring gears 67 which mesh with the gears 55. A screw conveyor tube 68 is fixed to the outer side of a portion of each of the walls 58 and said tubes extend outwardly therefrom to adjacent the outer mesh wire fabric portions 32. The inner discharge ends of the tubes 68 register with openings 69 of the walls 58. Outer portions of the tubes 68 are disposed radially above the floors 27 and said portions only are provided with elongated slots 70 which open downwardly and in the direction of rotation of the conveyor tube 68 as will hereinafter be described. The tubes 68 are provided with scraper blades 71 which extend downwardly at an angle from the bottom edges of the slots 70 in the direction of rotation of the conveyor tubes around the battery 20. The leading ends of the scraper blades 71 are disposed in contact with the upper surfaces of the floors 27, as best illustrated in Figures 4 and 11. A screw conveyor 72 is turnably mounted in each conveyor tube 68 and the shaft 73 thereof has an outer end which is journalled in the outer end wall 74 of the tube 68. The inner end of the shaft 73 extends through the registering opening 69 and is journalled in a bearing 75 which is mounted in and extends through the inner housing wall 59. A gear 76 is fixed to the inner end of the conveyor shaft 73 and is disposed between the wall 59 and the depending flange or wall 66 and meshes with an annular crown gear 77 which is secured to the supporting rods 23 and extend upwardly therefrom beneath the gear 76.

The walls 58 and 59 together with a portion of the top plate 64 and bottom plate 61 form a housing adjacent the level of each floor 27, into which the inner end of the conveyor tube thereof opens, and which housing is designated generally 78. As best seen in Figures 5 and 9, portions of the members 61, 57 and 56 are provided with registering openings 79 opening upwardly into the housing 78 and downwardly into an upper end of a discharge pipe 80 which is secured to a portion of the underside of the plate 56 around its opening 79. The other end of the pipe 80 opens into a vertically disposed discharge pipe 81 which extends downwardly through the service well 38 adjacent the post 21 and the lower end of which constitutes its outlet end. A suitable wiping element 82, as best seen in Figure 6, is secured in any suitable manner to the adjacent sides of portions of the walls 58 and 59 of each housing 78 and extends downwardly therefrom and has a bottom portion disposed in wiping engagement with the upper surface of the plate 61, between the channel members 60. The wiping element 82 is preferably disposed adjacent the inlet opening 69 and in a trailing position with respect thereto.

A stationary supporting rod or shaft 83 is fixed to and extends upwardly from the platform 47 and has its upper end journalled in a downwardly opening socket 84 which is fixed to or forms a part of a feed supply pipe 85 and which is disposed beneath and in axial alignment with an upwardly opening inlet end 86 of said feed pipe 85. The feed pipe 85 includes a downwardly inclined portion 87 which extends downwardly from the inlet portion 86 to beyond a portion of the periphery of the top wall 26, and a depending portion 88 which extends downwardly from the lower end of the inclined portion 87, outwardly with respect to the periphery of the battery 20. The inlet end 86 is swivelly connected to the discharge end of a suitable source of supply of feed and which may be supported in any suitable manner above the battery 20. As illustrated, the inlet end 86 is shown swivelly mounted on the outlet end 89 of a hopper 90, but said inlet end 86 could be similarly connected to a supply pipe or conduit in the same manner. The pipe portion 88 is provided with integral inwardly extending and downwardly inclined discharge spouts 91, corresponding in number to the number of floors 27 of the battery and the discharge ends of which are disposed to open above each set of coplanar feed troughs 40. As best seen in Figure 1, the pipe portion 88 narrows below each discharge spout 91 and said pipe portion at its lower end is closed and terminates in a downwardly opening socket 92 in which is journalled the upper end of a supporting leg 93 having a curved lower end 94, as best seen in Figure 15, through which extends an axle 95. A wheel 96 is journalled on the axle 95 and combines with the leg 93 to form a caster wheel which is disposed to ride on the floor or surface 22 for supporting the weight of the feed pipe 85 in conjunction with the post or rod 83.

As best illustrated in Figures 10, 13 and 14, the discharge spouts 91 are preferably rectangular in cross section and the side walls thereof are provided with inturned flanges 97 at the open end of the spout and the top wall thereof is provided with a downturned flange 98 which is disposed inwardly with respect to the flanges 97. A gate valve 99 is slidably mounted in the discharge end of each spout 91 between its flanges 97 and its flange 98 and is gravity urged downwardly to a closed position. A bracket 100 is secured to the upper side of the top wall of each spout 91 and has an upstanding arm 101 disposed directly above the flange 98 which is provided with vertically spaced openings 102. A fastening 103 such as a bolt and nut or pin extends slidably through an upper portion of the valve 99 and selectively through one of the openings 102 for adjustably supporting the valve 99 in any one of a plurality of positions varying from a slightly open position to a fully open position. A roller 104 is journalled on a pin 105, which pin is fixed to and depends from the lowermost spout 91, as seen in Figure 1. The roller 104 is supported by the headed lower end of the pin 105 and is positioned to ride on the outer sides of the bottommost set of coplanar feed troughs 40 to prevent inward displacement of the spouts 91 past their positions as illustrated in Figures 1, 4 and 10 relatively to the troughs 40. Obviously, if desired, each of the spouts 91 could be provided with a roller 104.

As best seen in Figure 4, an annular track 106, preferably of inverted channel shape cross section, is secured to the upper side of the top wall 26 concentrically around the post 21 and outwardly with respect to the shaft 51. A ring member 107 likewise of inverted channel shape cross section and larger in cross section than the track 106, is turnably supported on said track. The inner side of the inner wall of the ring member 107 is toothed to form an annular internal gear 108 which meshes with a pinion 109 fixed to the shaft 51. A rod 110 has an inner end secured to the ring member 107 and extends radially therefrom and is secured at its outer end to a bracket 113 which is fixed to a part of the feed pipe portion 87. An annular rail 111, which is likewise preferably of inverted channel shape cross section, is secured to the upper side of the top wall 26 concentrically around the track 106 and adjacent the periphery of the battery 20. A wheel or roller 112 is journalled on the rod 110 near its outer end and disposed to ride the upper surface of the rail 111.

From the foregoing it will be readily apparent that the timer 52 may be set to cause the motor 48 to be actuated for a predetermined period of time at predetermined intervals. During the time that the motor is operated, the shaft 51 will be driven thereby in a counterclockwise direction, as seen in Figure 5, for causing the gears 67 and the ring member 107 to be revolved in the same direction. The gears 67 will cause the housings 78 to likewise be rotated in the same direction or counterclockwise and the screw conveyor will rotate with said housings 78 with the scraper blades 71 thereof in leading positions scraping the floors 27, as best illustrated in Figure 11. The scrapings from the blades 71 will be deflected upwardly through the slots 70 into the tubes 68. As the housings 78 revolve the inner ends of the shafts 73 travel around the stationary crown gears 77 and as the gears 76 thereof are in mesh with the crown gears 77, so that the screw conveyors 72 are revolved in a direction for feeding the scrapings inwardly of the tubes 68 and through the openings 69 into the housings 78 in advance of the wiper elements 82. The scrapings are propelled by the wiping elements 82 along the stationary strips 61 until the wiping elements 82 approach the registering openings 79. The scrapings are discharged by gravity at each revolution of the housings 78 downwardly through the discharge openings 79 and thence by gravity through the conduits 80 and 81, to be discharged from the conduit 81 beneath the battery 20. Thus, the floors 27 of each poultry accommodating area 39 is periodically cleaned automatically. As seen in Figure 4, the tubes 68 travel below the stationary water troughs 35 and inner screen sections 36, which screen sections 36 are located sufficiently near the floors 27 to prevent the fowls escaping into the service well 38.

At the same time, rotation of the ring member 107 causes the feed pipe 85 to be revolved in the same direction or counterclockwise and as the feed spouts 91 travel over the feed troughs 40, feed will be discharged therefrom for refilling the troughs 40, assuming that the valves 99 are open to a desired extent. As the feed spouts 91 pass between adjacent ends of the troughs 40 the discharge ends thereof slide across the stationary plates 41 which close said spouts during their travel between the troughs 40 to thus allow discharge of the feed only while the spouts are located above the troughs. Furthermore, the timer 52 may be set to cause the feed pipe 85 to rotate or make a predetermined number of complete revolutions so that when the feed pipe 85 is not in motion the discharge ends of the spouts 91 will be disposed against and closed by certain of the closure plates 41. Thus, the poultry accommodating areas 39 will be simultaneously cleaned and the feed troughs 40 thereof simultaneously refilled automatically at predetermined intervals by operation of the motor 48.

Likewise, as previously described, the watering troughs 35 will be constantly maintained filled to a desired extent automatically by the float valves 44 controlling the spouts 43 of the supply pipe 42 which contains water under pressure, so that the poultry contained in the battery 20 will not require attention. The openings 33 and 37 are sufficiently large to accommodate the heads of the poultry or fowl so that the feed and water troughs are accessible thereto but are of insufficient size to permit escape of the fowl. The foraminous inner and outer walls 31, 32 and 34, 36 of the fowl accommodating or growing areas 39 will afford adequate ventilation for the fowl.

Various modifications and changes are contemplated and may obviously be resorted to, without departing from the spirit or scope of the invention as hereinafter defined by the appended claims.

I claim as my invention:

1. A poultry battery comprising a plurality of superimposed tiers defining superimposed stationary fowl occupying annular spaces, each of said tiers or fowl occupying spaces having a closed top, a floor and foraminous inner and outer walls, a center service well disposed within said inner walls and extending from top to bottom of the battery and having an open lower end, watering troughs disposed in said service well and supported by said foraminous inner walls above each of the floors, a water supply pipe adapted to contain water under pressure extending upwardly into the poultry battery through said service well and having branch pipes opening into said watering troughs, means automatically controlling the supply of water from said branch pipes to the watering troughs, feed troughs disposed around the poultry battery and supported thereon externally of the outer foraminous walls and above each of said floors, said inner and outer foraminous walls having openings above and adjacent said troughs affording access to the troughs for the heads of fowls, a gravity supplied feed supply pipe having a portion extending vertically along the outer side of the battery and including downwardly inclined discharge spouts opening above said feed troughs for supplying feed thereto, and a driving means connected to said feed supply pipe for imparting rotation thereto for causing the feed supply pipe to travel around the battery for supplying feed circumferentially to said feed troughs.

2. A poultry battery as in claim 1, scraping and conveying means extending radially across each of said floors and inwardly therefrom into the service well beneath said inner foraminous walls, annular supporting members mounted in the service well and connected to the inner ends of said scraping and conveying means, supporting means mounted in said service well on which said supporting members are mounted for rotation around the water supply pipe and above and beneath the branch pipes, and means forming a driving connection between said driving means and the supporting members and scraping and conveying means for revolving the supporting members and the scraping and conveying means for causing said scraping and conveying means to scrape the floors and for actuating the conveying means for conveying the scrapings radially of the scraping and conveying means into the service well.

3. A poultry battery as in claim 2, said supporting means constituting stationary bottoms of rotary housings formed by said annular supporting members into which said scraping and conveying means discharge, said supporting means having openings through which the scrapings are discharged, and means supported by and disposed within said annular supporting members for conveying the scrapings to the openings of the supporting means.

4. A poultry battery as in claim 3, a gravity discharge conduit disposed within the service well having branch conduits connected with the openings of said supporting means for carrying off the scrapings from the poultry battery by gravity.

5. A poultry battery as in claim 4, and a timer controlling operation of said driving means and causing said driving means to be operated for predetermined periods of time at predetermined intervals.

6. A poultry battery as in claim 1, each of said tiers having a plurality of circumferentially spaced feed troughs, plates supported by the battery and extending between adjacent ends of said troughs and disposed to be engaged by the discharge ends of the feed spouts for closing said feed spouts while in contact with said plates.

7. A poultry battery as in claim 1, a supporting post extending centrally through said service well, a plurality of sets of rods fixed to and extending radially from said post and on which said annular floors are supported.

8. A poultry battery as in claim 7, a top wall disposed around and secured to said post and forming the closed top of said uppermost tier or fowl accommodating space and the closed top of said service well, and hanger means depending from said top wall and from said floors for supporting said inner foraminous walls.

9. A poultry battery as in claim 8, a motor forming a part of said driving means and supported on the upper end of said post above said top wall, and other portions of said driving means, forming a driving connection between said motor and feed supply pipe, being rotatably supported on said top wall.

10. A poultry battery unit comprising a floor and a top each having substantially circular inner and outer peripheries, an outer wall extending downwardly from the outer periphery of said top to a point spaced from the outer periphery of said floor, an inner wall disposed substantially concentric with said outer wall and extending downwardly from the inner periphery of the top to a point spaced from the inner periphery of said floor, interconnecting means extending between and secured to complementary portions of the floor and top, and watering and feeding devices supported by the battery unit adjacent said inner wall and said outer wall, respectively.

11. A poultry battery unit as in claim 10, scraping and conveying means extending radially across said floor and inwardly therefrom beneath said inner wall, and rotary driven means connected to an inner end of said scraping and conveying means for propelling said scraping and conveying means in a circular course around the floor for scraping the floor and for conveying the scrapings radially toward the inner end of said scraping means.

12. A poultry battery unit as in claim 10, gravity supply means for supplying feed to said feeding devices, and rotary driven means supported by said battery unit and connected to said feed supply means and operative for moving said feed supply means in a circular path around the battery unit.

References Cited in the file of this patent

UNITED STATES PATENTS

| | | |
|---|---|---|
| 2,041,049 | Crawford | May 19, 1936 |
| 2,096,356 | Fox | Oct. 19, 1937 |
| 2,191,651 | Haesloop | Feb. 27, 1940 |
| 2,311,640 | Cornell | Feb. 23, 1943 |
| 2,314,344 | Cornell | Mar. 23, 1943 |
| 2,339,043 | Armstrong | Jan. 11, 1944 |
| 2,601,057 | Roberts et al. | June 17, 1952 |

FOREIGN PATENTS

| | | |
|---|---|---|
| 564,284 | France | Oct. 16, 1923 |